(12) United States Patent
Nelson et al.

(10) Patent No.: US 6,478,517 B1
(45) Date of Patent: Nov. 12, 2002

(54) METHOD AND APPARATUS FOR SHIPPING AND/OR STORING DRY PARTICULATE MATTER

(75) Inventors: Charles M. Nelson; Michael J. Rose, both of Houston, TX (US)

(73) Assignee: Cortainer Patent Warehouse, LLC, Houston, TX (US)

(*) Notice: Subject to any disclaimer, the term of this patent is extended or adjusted under 35 U.S.C. 154(b) by 63 days.

(21) Appl. No.: 09/785,347

(22) Filed: Feb. 16, 2001

Related U.S. Application Data (60) Provisional application No. 60/183,069, filed on Feb. 16, 2000.

(51) Int. Cl.$^7$ .............................. B60P 1/56; B61D 17/10; B61D 17/18
(52) U.S. Cl. .................. 410/68; 105/254; 105/375; 105/423; 298/25; 410/140
(58) Field of Search ................... 298/24, 25, 27; 410/68, 129, 140; 105/243, 254, 370, 371, 373, 375, 405, 422, 423

(56) References Cited

U.S. PATENT DOCUMENTS

| | | | | | |
|---|---|---|---|---|---|
| 280,621 A | * | 7/1883 | Hetfield | ............ | 414/387 |
| 522,987 A | * | 7/1894 | Johnson | ............ | 298/27 |
| 850,719 A | * | 4/1907 | Aulls | ............ | 105/243 |
| 1,262,025 A | * | 4/1918 | Dickson | ............ | 105/423 |
| 1,419,769 A | * | 6/1922 | Scherl | ............ | 105/243 |
| 2,311,501 A | * | 2/1943 | Zoldok | ............ | 105/276 |
| 3,413,032 A | * | 11/1968 | Dendy | ............ | 298/8 H |
| 3,485,434 A | | 12/1969 | Donovan et al. | ............ | 220/608 |
| 3,995,541 A | * | 12/1976 | Coyle et al. | ............ | 454/91 |
| 4,138,163 A | | 2/1979 | Calvert et al. | ............ | 302/52 |
| 4,258,953 A | * | 3/1981 | Johnson | ............ | 298/27 |
| 4,589,565 A | | 5/1986 | Spivey | ............ | 220/71 |
| 4,789,130 A | | 12/1988 | Stich et al. | ............ | 249/120 |
| 5,113,769 A | * | 5/1992 | Okuno et al. | ............ | 105/422 |
| 5,418,038 A | * | 5/1995 | Wise et al. | ............ | 428/192 |
| 5,484,643 A | * | 1/1996 | Wise et al. | ............ | 428/192 |
| 5,615,798 A | | 4/1997 | Luburic et al. | ............ | 220/572 |
| RE36,214 E | * | 6/1999 | Podd, Sr. et al. | ............ | 220/1.5 |

\* cited by examiner

*Primary Examiner*—D. Glenn Dayoan
*Assistant Examiner*—Paul Chenevert
(74) *Attorney, Agent, or Firm*—The Matthews Firm

(57) ABSTRACT

A rectangular sheet of extruded, twin-walled, fluted plastic fabricated from a polyethylene copolymer is scored with N parallel lines, wherein N is any odd number three (3) or greater. The sheet of plastic is then bent or otherwise configured along the N parallel lines to form N+1 panels. The first and last panels are snapped into place along the opposing sidewalls, respectively, of a shipping container. The intermediate panels are bent into $$\frac{N+1}{2}$$

V-shaped configurations which together will hold the bottom portion of a load of dry particle materials which will be shipped or stored therein. The materials may be loaded and unloaded through parts.

5 Claims, 6 Drawing Sheets

METHOD AND APPARATUS FOR SHIPPING AND/OR STORING DRY PARTICULATE MATTER

RELATED APPLICATION

This application claims priority from U.S. Provisional Patent Application Ser. No. 60/183,069, filed Feb. 16, 2000.

FIELD OF INVENTION

The invention relates generally, to methods and apparatus for shipping and/or storing dry particulate matter which may be, for example, dry cement, sugar, polyolefin pellets, beans, rice, and the like. In particular, the invention may be used in box cars pulled by railway locomotives and may also be used in steel or other metal shipping containers carried by ocean freighters.

BACKGROUND OF INVENTION

It is well known in this art to ship dry particulate matter in railway cars or in shipping containers used on freighters. However, such shipment containers are extremely expensive and typically manufactured from stainless steel or other such materials which drive up the costs.

PRIOR ART

Examples of various prior art references which address the shipment of dry particulate matter are:

U.S. Pat. No. 4,941,581;
U.S. Pat. No. 4,258,953;
U.S. Pat. No. 4,273,477;
U.S. Pat. No. 5,195,851;
and U.S. Pat. No. 4,195,954.

OF THE INVENTION DETAILED DESCRIPTION OF PREFERRED EMBODIMENT

Figure 1:
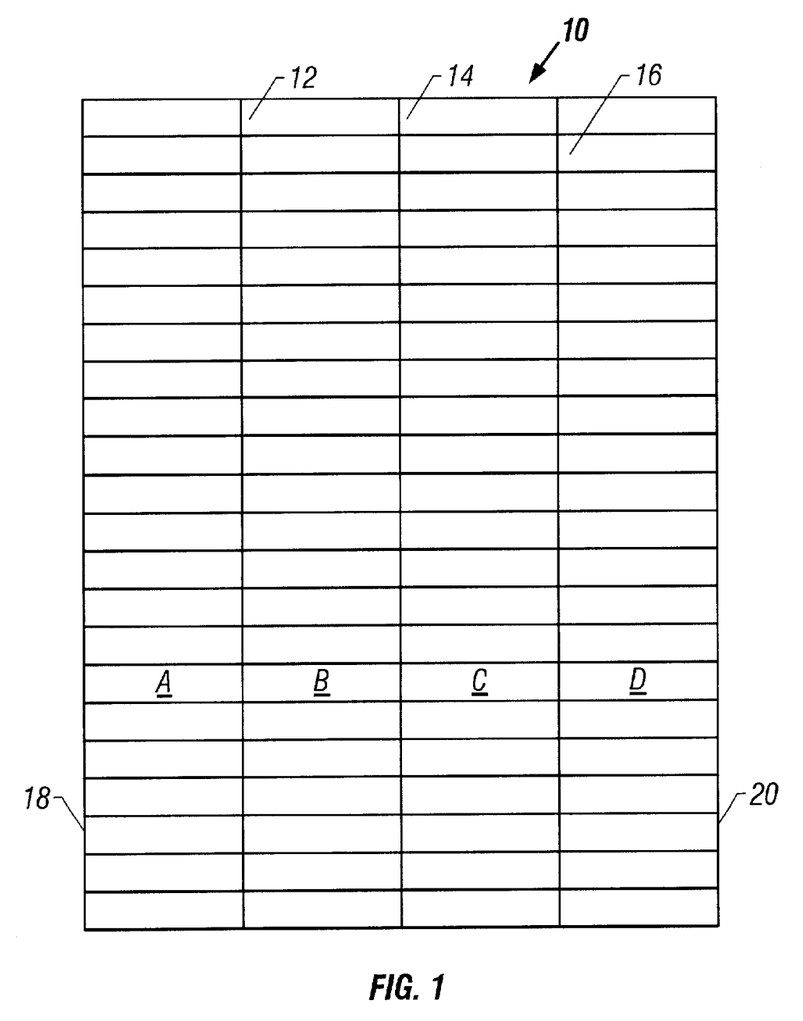
FIG. 1 illustrates a top plan view of a sheet of an extruded, twin-walled fluted plastic scored along three (3) parallel lines.

FIG. 1 is a plane drawing showing a rectangular sheet of COROPLAST material 10 which has been scored along the parallel lines 12, 14 and 16, being an extruded, twin-walled fluted plastic based upon a polypropylene copolymer available from Coroplast, Inc., 4501 Spring Valley Road, Dallas, Tex. 75244, under their COROPLAST Trademark. For ease of reference, the plastic will sometimes be referred to hereinafter as the ""COROPLAST material". The section 10 is preferably between 3 and 10 mm thick, but in the most preferred embodiment is 10 mm thick.

As will be described in greater detail hereinafter, the scoring of the COROPLAST material allows the material to be easily bent along score lines to result in distinct sections. The scoring process, as used throughout this specification, does not cut the COROPLAST material at all, but rather crushes the material from one side to the other, resulting in a flexible hinge along the entire length of the scoring line having essentially an infinite number of bending cycles without breaking or tearing the material.

Figure 2:
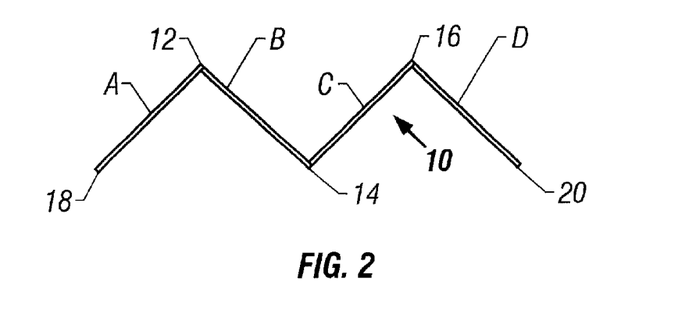
FIG. 2 illustrates an elevated, end view of the sheet illustrated in FIG. 1 which has been configured along the three (3) parallel lines to result in the end view illustrated in FIG. 2.

FIG. 2 illustrates the sheet 10 being bent along the scored lines 12, 14 and 16. It should be appreciated that the lateral edges 18 and 20 of the sheet 10, when folded into the configuration of FIG. 2, are further apart when so folded than the internal dimension of the railcar or other metal container in which the so configured sheet 10 will be snapped into place.

Figure 3:
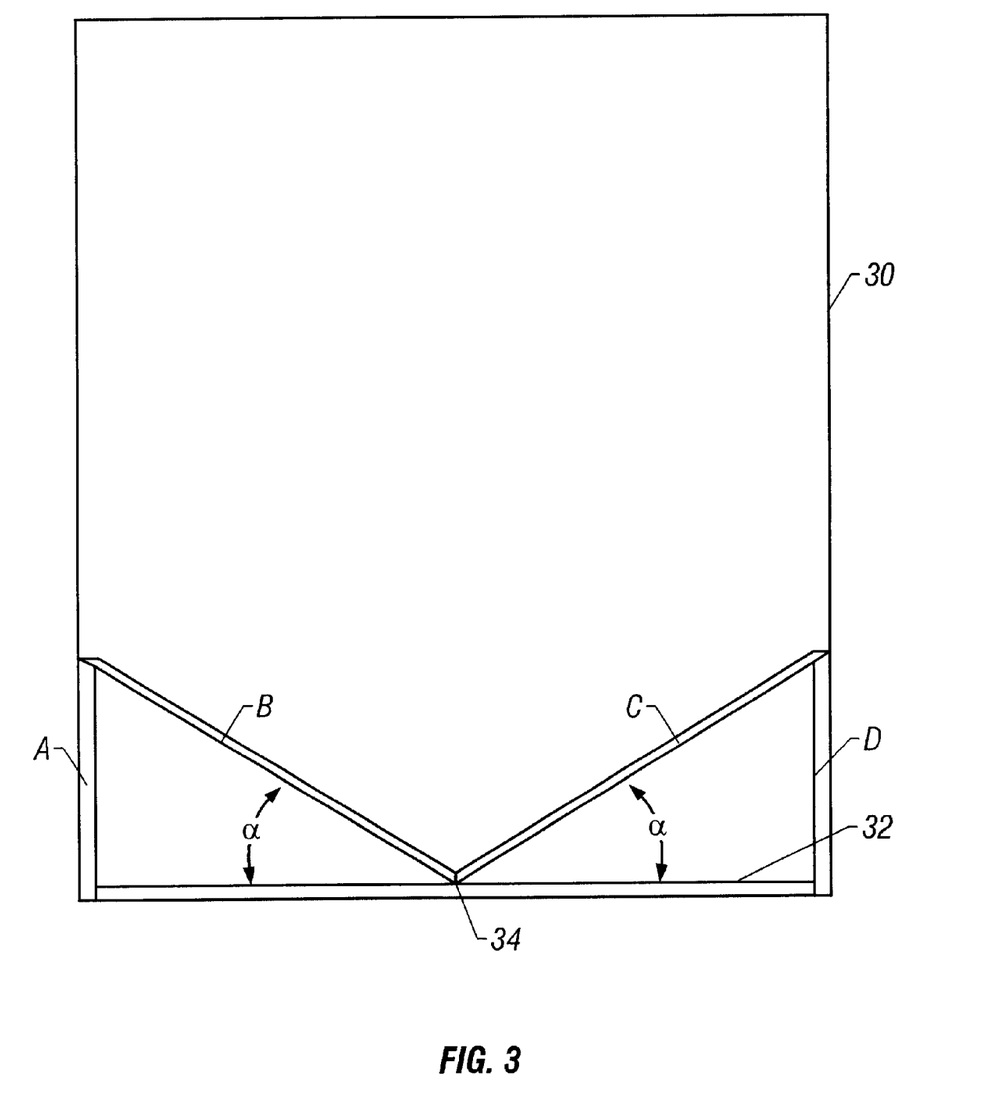
FIG. 3 illustrates an elevated end view of the configured sheet of FIG. 1 but which has its two (2) end panels in place against the sidewalls, respectively, of either a shipping container or of a trailer.

FIG. 3 illustrates how the panels A, B, C and D are configured after the configured sheet 10 is snapped into place inside the container 30 of FIG. 3. As a result of the sheet 10 being snapped into place as illustrated in FIG. 3, the panels A and D are snugly in place against the interior walls of the container 30. Prior to snapping the configuration of FIG. 2 into place in the interior of the steel tank of FIG. 3, a second sheet 32 of COROPLAST material is placed on the bottom floor of the container 30 to help guard against the possibility of there being holes or other leakage points in the bottom floor of the container 30. In addition, an inner liner fabricated preferably from polyurethane, is placed within the interior of the container 30 prior to inserting the COROPLAST sheet 10 as configured in FIG. 3.

It should be appreciated that the angle between the panel B and the floor covering 32 and between the Panel C and such floor covering 32 has to exceed the angle of repose. It is well known that the angle of repose is an angle which determines whether the dry particulate material will slide down the Panels B and C. The measurement of the angle of repose provides a method for the determination of the co-efficient of friction. The magnitude of the force of friction is variable and would be a function not only of the surface of the COROPLAST Panels B and C, but also of the materials which will easily slide down the Panels B and C to the vortex 34 between the Panels B and C. In the present invention, it is contemplated that the angle of repose will be approximately 30° so the angle α needs to be a slightly higher angle than 30°, for example, somewhere between 33° and 40°. It is important that the angle α not be too much larger than the angle of repose because to do so cuts into the volume which can be transported within the container 30 above the COROPLAST Panels B and C.

Figure 4:
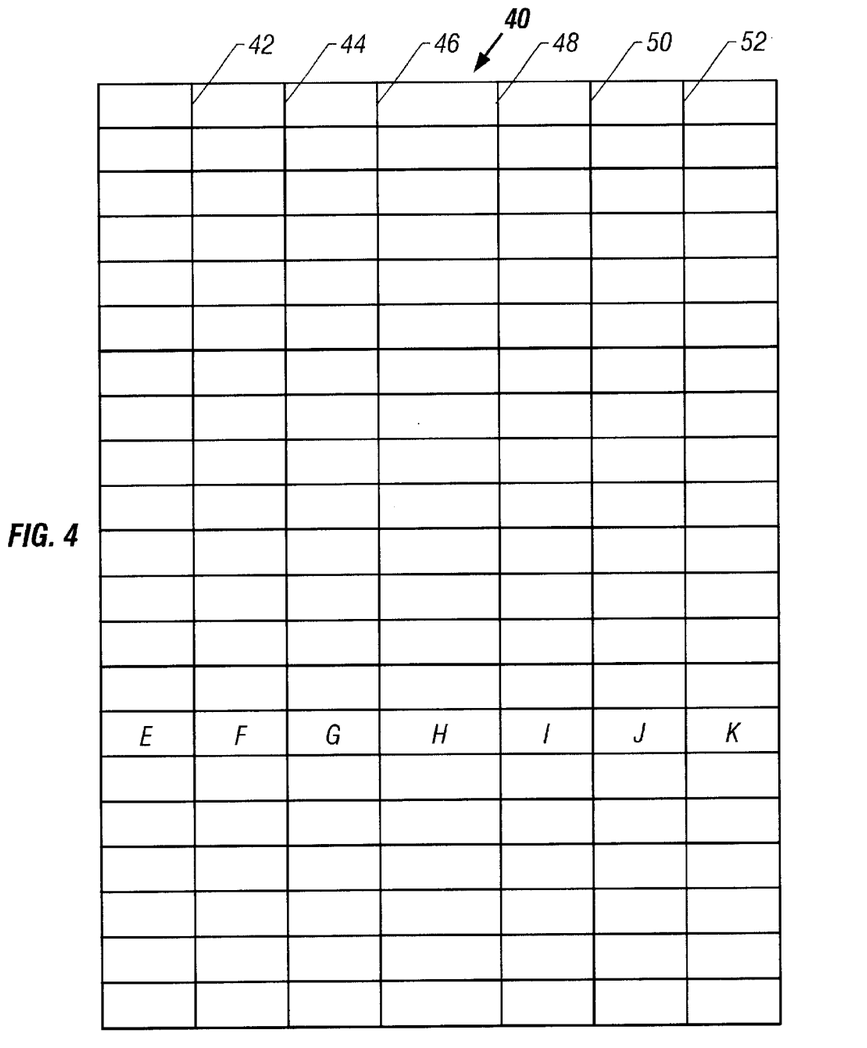
FIG. 4 illustrates a single sheet of the plastic, such as the sheet of FIG. 1 which has been scored by six (6) parallel lines which are then configured along such lines to form the box illustrated in FIG. 4A.

Referring now to FIG. 4, there is illustrated a second sheet of COROPLAST material 40 which is scored along parallel lines, 42, 44, 46, 48, 50 and 52 which when bent along such lines forms panels E, F, G, H, I, J and K.

Figure 4A:
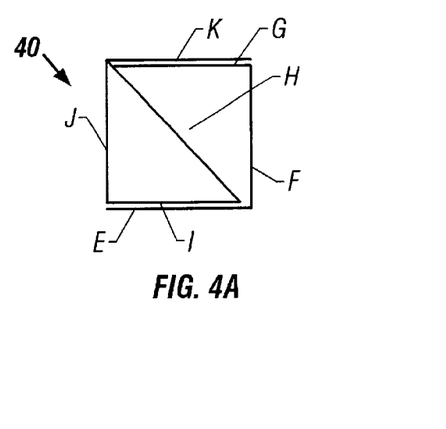

As is illustrated in FIG. 4(a), the COROPLAST material 40 of FIG. 4 can be formed into a box configuration which is utilized in the embodiment of FIG. 6 hereinafter. If the configuration of FIG. 4(a) is intended to be a square, in cross-section, the bracing member formed by the panel H has to be longer than the other panels because it represents the hypotenuse of an angle formed with the panels I and J as soon as the box is as configured as in FIG. 4(a). The panels K and G can either be taped together or heat welded together and similarly the panels I and E can either be taped together or heat welded together. It should be appreciated that the panel H, being diagonal, provides mechanical support for the box illustrated in FIG. 4(a).

Figure 5:
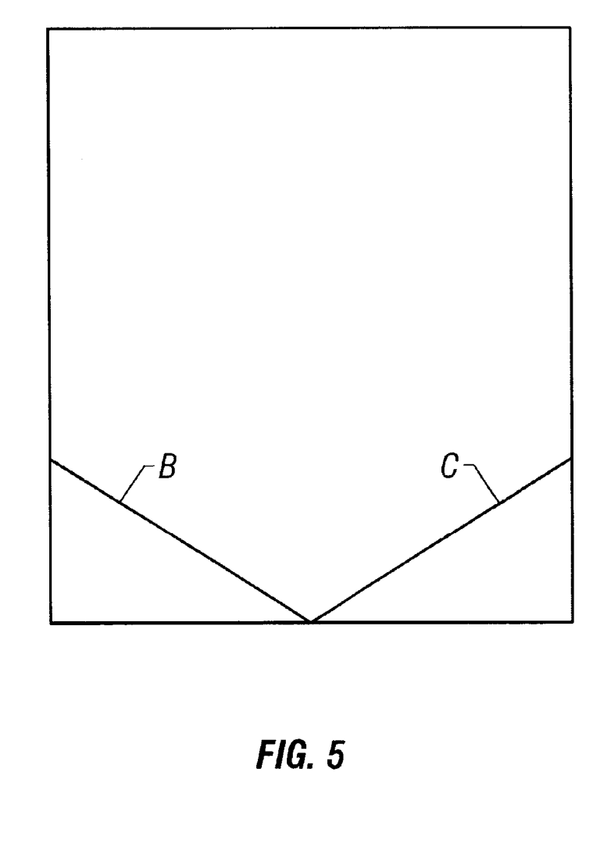
FIG. 5 illustrates an elevated end view of the configuration illustrated in FIG. 3, without showing the support boxes such as are illustrated in FIG. 4A.

Referring now to FIG. 5, there is an illustration of the fact that the useable material or cubic feet of shipable material is 1,850 cubic ft. when used with a container which is 92 inches wide, 108 inches tall and 474 inches long.

Figure 6:
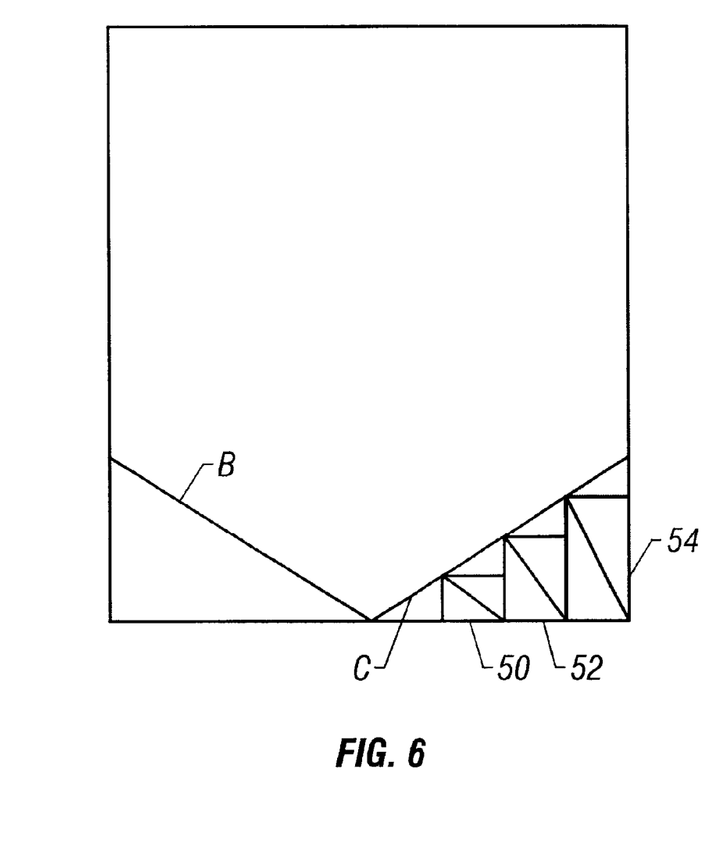
FIG. 6 illustrates the configuration of FIG. 5, but also illustrating the support boxes of FIG. 4A under one side of such configuration.

FIG. 6 illustrates the same embodiment of FIG. 5 but includes three boxes 50, 52 and 54 fabricated along similar lines as illustrated in FIGS. 4 and 4(a), the boxes providing a means for supporting the underside of the Panels B and C when the dry particulate matter is added to the interior of the shipping container.

On a similar mode, but not illustrated, three additional boxes are located under the panel B to support the panel B. It should be appreciated that the diagonal members such as the panel H in FIG. 4(a) is angled back in the other direction from that illustrated for that same diagonal in the boxes 50, 52 and 54, such that the diagonals supporting the panel B are essentially perpendicular to the plane of the panel B and in a similar manner, the diagonals for the boxes 50, 52 and 54 are essentially perpendicular to the plane surface of panel C.

Figure 7:
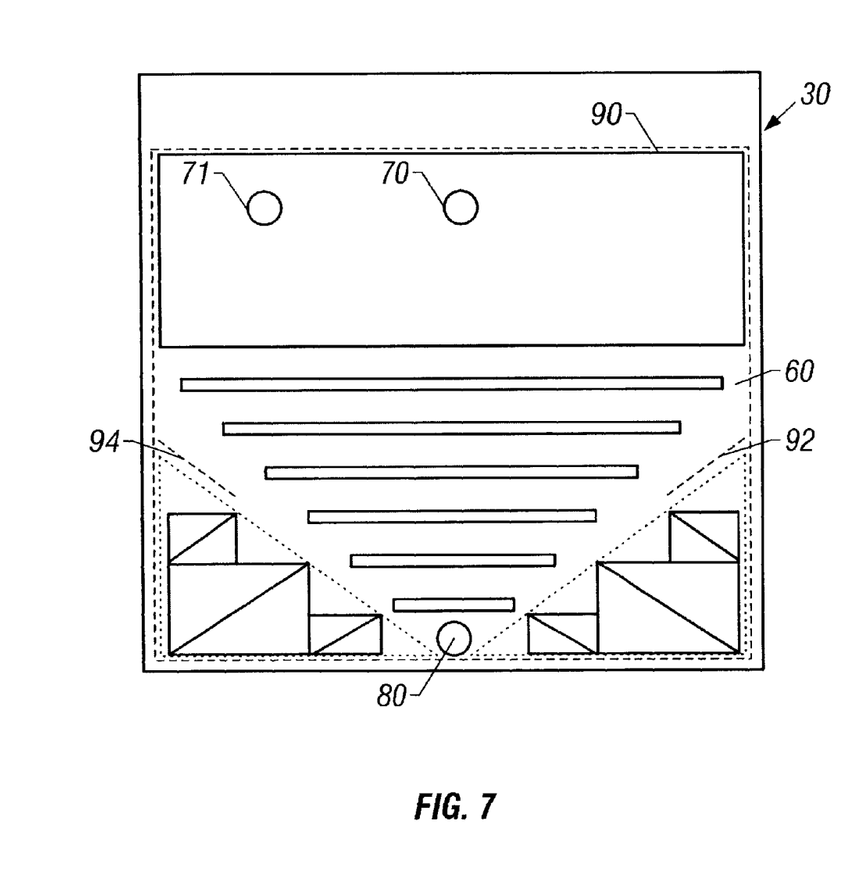
FIG. 7 illustrates an elevated end view of the device of FIG. 3, but showing more detail.
Figure 8:
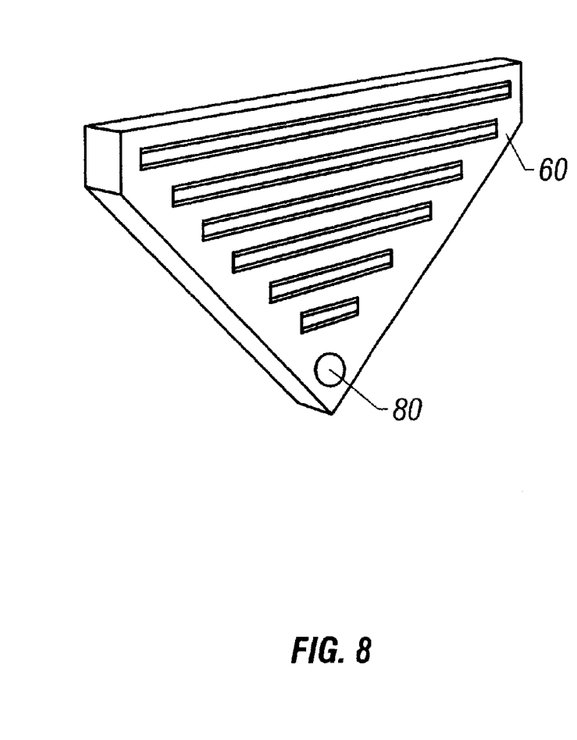
FIG. 8 illustrated an elevated pictorial view of the bulkhead used with the apparatus of FIG. 7.

FIG. 7 illustrates an end view of the container 30 which illustrates a reinforced bulkhead 60 which in this embodiment illustrates the bulkhead as being v-shaped to fit into the v-shaped trough illustrated in FIG. 3. FIG. 7 also illustrates a loading port 70, a vent port 71. and a discharge port 80. FIG. 8 is merely an isometric view of the bulkhead 60 illustrated in FIG. 7. Referring further to FIG. 7, while in theory at least, the liner 90, fabricated from polyurethane and being scrim reinforced, could be placed under the bottom of the floor panel 32 illustrated in FIG. 3, because the bottom floor might have rough surfaces which would tend to tear into the liner 90, it is preferred that the liner bottom be placed on top of the floor 32.

While the embodiment as illustrated in FIG. 7 contemplates the use of a v-shaped bulkhead, the bulkhead can be rectangular shaped and go all the way from the top of the liner 90 down to the floor 32, if desired. Similarly, a second bulkhead would be found at the back of the trough illustrated in FIG. 3. Probes are used to load the dry particulate matter into the loading port 70 while this discharge port 80 is maintained closed. When it is desired to empty out the particulate matter from the apparatus of FIG. 7, a probe is inserted into the discharge port 80 and utilizes a vacuum to pull all of the dry particulate matter out of the apparatus of FIG. 7. Because the angle formed by panels B and C exceeds the angle of repose, a vacuum device hooked into the discharge port 80 will discharge quite efficiently all of the dry particulate matter residing within the container 30. In practice, if the container 30 has doors at one end, such as with a shipping container, the discharge port 80, the loading port 70 and the vent port 71 can be accessed upon opening one of the doors at the end of the container 30.

As an additional feature, the liner 90 has a skirt 92 and a skirt 94, which if desired can be one continuous skirt, to insure that the dry particulate matter being shipped doesn't fall over behind the three boxes which are utilized under each of the panels B and C.

In the operation of using the system according to the present invention, the loading port 70, the vent port 71 and the discharge port 80 are normally closed. The ports 70, 71 and 80 can take various forms but preferably are comprised of a tube which can be rolled up and unrolled, much like an elephant's snout, and when it is desired to open them, can be opened by inserting a cylindrical probe there through to provide ingress or egress of the materials in and out of the container. To allow the dry particulate matter to be pumped in through the port 70 by the use of a probe, it is preferable to also insert a probe into the vent port 71 to allow air to escape from inside the liner as the particulate matter is being pumped into the ladder. When it is desired to retrieve the material from inside the container, a cylindrical probe can be inserted into the discharge port and a vacuum assembly (not illustrated) can be attached to the other end of the probe to allow all of the material within the container to be discharged through the vacuum assembly.

As an additional feature of the invention, after the particulate material is pumped into the port 70, the air within the liner can be evacuated through the port 70 and the air which has been removed can be replaced by nitrogen to form a nitrogen blanket over the material being shipped.

Figure 9:
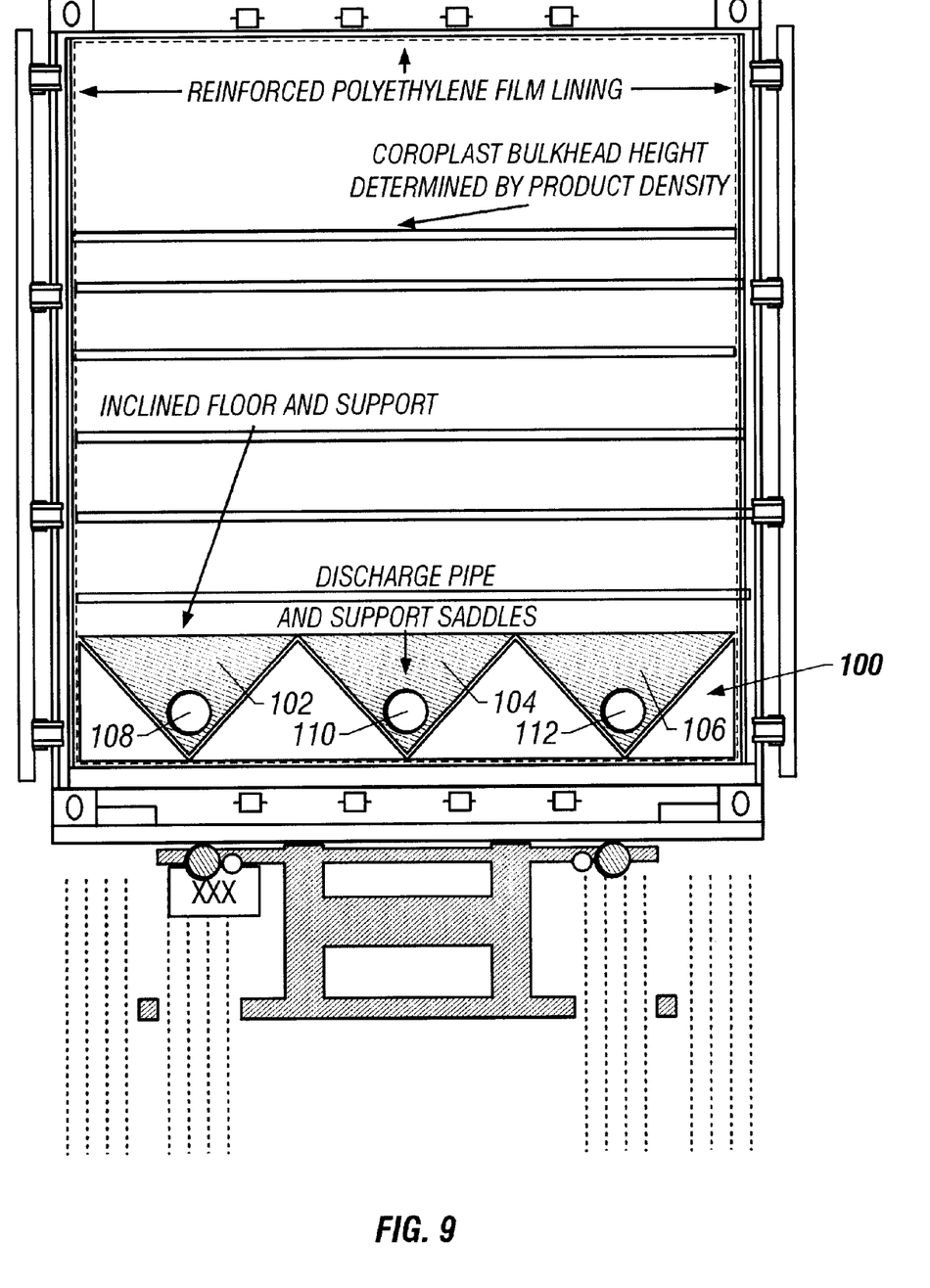
FIG. 9 illustrates an alternative embodiment of the invention, showing an elevated, end view of a configuration having three (3) V-shaped troughs instead of the simple V-shaped embodiment of FIG. 3.

Referring now to FIG. 9, there is illustrated an alternative embodiment of a multiple trough configuration 100, which in this embodiment uses three (3) V-shaped troughs 102, 104 and 106, with three (3) discharge ports 108, 110 and 112, respectively. The configuration 100 is fabricated merely by scoring a single sheet of the COROPLAST material with seven (7) parallel lines and bending the material to result in eight (8) panels as illustrated in FIG. 9.

It should be appreciated that there are two improvements in the embodiment of FIG. 9, comparable with the embodiment of FIG. 7. Assuming the angle of repose is respected, viz, about 30°, and that the angle of the panels making up a given V-shape are slightly larger than the angle of repose, viz, 40°–45°, then the volume of the shipped material with three (3) V-shaped troughs will always exceed the volume shipped in a single trough. Moreover, with three (3) troughs, the boxes of FIG. 7 shown underneath the panels making up the single V can be eliminated.

Thus, while a single V-shaped device works quite well, any number greater than one will work even better.

What is claimed is:

1. A dry bulk transport and storage unit for use in a transport vessel such as a sea container chassis, a railway car or a flatbed truck trailer, comprising:

a continuous rectangular sheet of extruded, twin-walled, fluted plastic based upon a polypropylene copolymer scored along three (3) spaced, parallel lines, said sheet being configured along said three lines to produce first, second, third and fourth panels together having an M-shape in cross-section, with the first and fourth panels being parallel to and positioned against the opposing sidewalls of the transport container, and the second and third panels forming a V-shaped configuration whose apex is within the interior of said transport vessel and in close proximity to the floor of said transport vessel.

2. The unit according to claim 1, including in addition thereto, at least one support member resting on the floor of said transport container, for each of said second and third panels, and upon which said second and third panels, reside, respectively, when said V-shaped configuration of said second and third panels is filled, at least partially, with the dry bulk material being transported or stored.

3. The unit according to claim 2, including in addition thereto, a polyethylene lining encompassing said configured plastic panels, said support members, and said dry bulk materials being transported or stored.

4. A dry bulk transport and storage unit for use in a transport vessel such as a sea container chassis, a railway car or a flatbed truck trailer, comprising:

a continuous rectangular panel of extruded, twin-walled, fluted plastic based upon a polypropylene copolymer scored along seven (7) spaced, parallel lines, said sheet being configured along said seven lines to produce first, second, third, fourth, fifth, sixth, seventh and eighth panels with the first and eighth panels being parallel to and positional against the opposing sidewalls of the transport container, and the second and third panels forming a V-shaped configuration whose apex is within the interior of said transport vessel and in close proximity to the floor of said transport vessel, and the fourth and fifth panels forming a V-shaped configurations whose apex is within the interior of said transport vessel and in close proximity to the floor of said transport vessel, and the sixth and seventh panels forming a V-shaped configuration whose apex is within the interior of said transport vessel and in close proximity to the floor of said transport vessel.

5. A dry bulk transport and storage unit for use in a transport vessel such as a sea container chassis, a railway car or a flatbed truck trailer, comprising:

a continuous rectangular sheet of extruded, twin-walled, fluted plastic based upon a polypropylene copolymer scored along N spaced, parallel lines, said sheet being configured along said N lines to produce N+1 panels, with the first and last panels being parallel to and positioned against the opposing sidewalls of the transport container, and the remaining panels forming $$\frac{N+1}{2}$$

V-shaped configurations, each of whose apex is within the interior of said transport vessel and in close proximity to the floor of said transport vessel, when N is any odd number of three (3) or greater.

* * * * *

UNITED STATES PATENT AND TRADEMARK OFFICE
CERTIFICATE OF CORRECTION

| | | |
|---|---|---|
| PATENT NO. | : 6,478,517 B1 | |
| DATED | : November 12, 2002 | |
| INVENTOR(S) | : Nelson, Charles M. and Rose, J. Michael | |

It is certified that error appears in the above-identified patent and that said Letters Patent is hereby corrected as shown below:

<u>Title page,</u>
Item [75], Inventors, please replace "Michael J. Rose" with -- J. Michael Rose --

Signed and Sealed this

Thirtieth Day of September, 2003

JAMES E. ROGAN
*Director of the United States Patent and Trademark Office*